US012631659B2

(12) United States Patent (10) Patent No.: US 12,631,659 B2
Ebihara et al. (45) Date of Patent: May 19, 2026

(54) AUTOMATED ANALYZER

(71) Applicant: Hitachi High-Tech Corporation, Tokyo (JP)

(72) Inventors: Daisuke Ebihara, Tokyo (JP); Shinya Matsuoka, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 920 days.

(21) Appl. No.: 17/910,927

(22) PCT Filed: Feb. 3, 2021

(86) PCT No.: PCT/JP2021/003871
§ 371 (c)(1),
(2) Date: Sep. 12, 2022

(87) PCT Pub. No.: WO2021/186931
PCT Pub. Date: Sep. 23, 2021

(65) Prior Publication Data
US 2023/0139301 A1 May 4, 2023

(30) Foreign Application Priority Data
Mar. 18, 2020 (JP) ................................. 2020-047208

(51) Int. Cl.
*G01N 35/10* (2006.01)
*G01N 35/00* (2006.01)

(52) U.S. Cl.
CPC ... *G01N 35/1002* (2013.01); *G01N 35/00663* (2013.01); *G01N 35/00732* (2013.01);
(Continued)

(58) Field of Classification Search
CPC ......... G01N 35/1002; G01N 35/00663; G01N 35/00732; G01N 35/1016;
(Continued)

(56) References Cited

U.S. PATENT DOCUMENTS 5,555,767 A 9/1996 Makino et al.
5,789,252 A 8/1998 Fujita et al.
(Continued)

FOREIGN PATENT DOCUMENTS

CN 104165985 A 11/2014
CN 104169707 A 11/2014
(Continued)

OTHER PUBLICATIONS

Search Report mailed Apr. 6, 2021 in International Application No. PCT/JP2021/003871.
(Continued)

*Primary Examiner* — John Mcguirk
(74) *Attorney, Agent, or Firm* — Miles & Stockbridge, P.C.

(57) ABSTRACT

To provide an automatic analyzer capable of relaxing the effect of a previously created mixed liquid when a new mixed liquid is created. An automatic analyzer according to the present disclosure: is configured so as to create a second mixed liquid after a first mixed liquid is created; and introduces a relaxation reagent to relax the effect of a first reagent remaining in a mixed liquid chamber when the second mixed liquid is created into the mixed liquid chamber on the basis of characteristics of the first mixed liquid.

26 Claims, 7 Drawing Sheets

(52) U.S. Cl.
CPC .................... *G01N 35/1016* (2013.01); *G01N 2035/00465* (2013.01); *G01N 2035/00673* (2013.01); *G01N 2035/0091* (2013.01)

(58) Field of Classification Search
CPC .......... G01N 2035/00465; G01N 2035/00673; G01N 2035/0091; G01N 35/00
See application file for complete search history.

(56) References Cited

U.S. PATENT DOCUMENTS

| | | | |
|---|---|---|---|
| 5,800,056 | A | 9/1998 | Suzuki et al. |
| 2014/0341779 | A1 | 11/2014 | Takemoto |
| 2014/0377771 | A1 | 12/2014 | Bibette et al. |
| 2019/0346468 | A1* | 11/2019 | Nakasawa .............. G01N 21/15 |
| 2019/0369130 | A1 | 12/2019 | Asakura |

FOREIGN PATENT DOCUMENTS

| | | | |
|---|---|---|---|
| CN | 104620112 | A | 5/2015 |
| CN | 107206383 | A | 9/2017 |
| CN | 110568209 | A | 12/2019 |
| EP | 0670483 | A2 | 9/1995 |
| EP | 0769547 | A2 | 4/1997 |
| EP | 2804005 | A1 | 11/2014 |
| JP | H09-033538 | A | 2/1997 |
| JP | 2017-015418 | A | 1/2017 |
| WO | 2013154734 | A1 | 10/2013 |
| WO | 2016130563 | A1 | 8/2016 |
| WO | WO-2018135384 | A1 * | 7/2018 ............. G01N 21/82 |

OTHER PUBLICATIONS

Written Opinion mailed Apr. 6, 2021 in International Application No. PCT/JP2021/003871.

Office Action mailed Jun. 13, 2025 in Chinese Application No. 202180020553.1.

Search Report mailed Apr. 18, 2024 in European Application No. 21771710.7.

* cited by examiner

FIG. 3

| CYCLE | ANALYTE | REAGENT QUANTITY [µL] | | | |
|---|---|---|---|---|---|
| | | PURE WATER | ORGANIC SOLVENT | ACIDIC SOLVENT | BASIC SOLVENT |
| 1 | A | 0 | 100 | 0 | 0 |
| 2 | B | 20 | 80 | 0 | 0 |

PURE WATER : ORGANIC SOLVENT = 1 : 4

| CYCLE | ANALYTE | RESIDUAL REAGENT [µL] | | | | RELAXATION REAGENT [µL] | | | |
|---|---|---|---|---|---|---|---|---|---|
| | | PURE WATER | ORGANIC SOLVENT | ACIDIC SOLVENT | BASIC SOLVENT | PURE WATER | ORGANIC SOLVENT | ACIDIC SOLVENT | BASIC SOLVENT |
| 1 | A | 0 | 0 | 0 | 0 | 0 | 0 | 0 | 0 |
| 2 | B | 0 | 10 | 0 | 0 | 2.5 | 0 | 0 | 0 |

PURE WATER : ORGANIC SOLVENT = 2.5 : 10 = 1 : 4

FIG. 5

| CYCLE | ANALYTE | REAGENT QUANTITY [μL] | | | |
|---|---|---|---|---|---|
| | | PURE WATER | ORGANIC SOLVENT | ACIDIC SOLVENT | BASIC SOLVENT |
| 1 | A | 90 | 100 | 10 | 0 |
| 2 | B | 20 | 80 | 0 | 0 |

PURE WATER : ORGANIC SOLVENT = 1 : 4     BOTH ACIDIC AND BASIC ARE ZERO

| CYCLE | ANALYTE | RESIDUAL REAGENT [μL] | | | | RELAXATION REAGENT [μL] | | | |
|---|---|---|---|---|---|---|---|---|---|
| | | PURE WATER | ORGANIC SOLVENT | ACIDIC SOLVENT | BASIC SOLVENT | PURE WATER | ORGANIC SOLVENT | ACIDIC SOLVENT | BASIC SOLVENT |
| 1 | A | 0 | 0 | 0 | 0 | 0 | 0 | 0 | 0 |
| 2 | B | 9 | 0 | 1 | 0 | 0 | 36 | 0 | 1 |

PURE WATER : ORGANIC SOLVENT = 9 : 36 = 1 : 4

BOTH ACIDIC AND BASIC ARE ZERO

FIG. 6

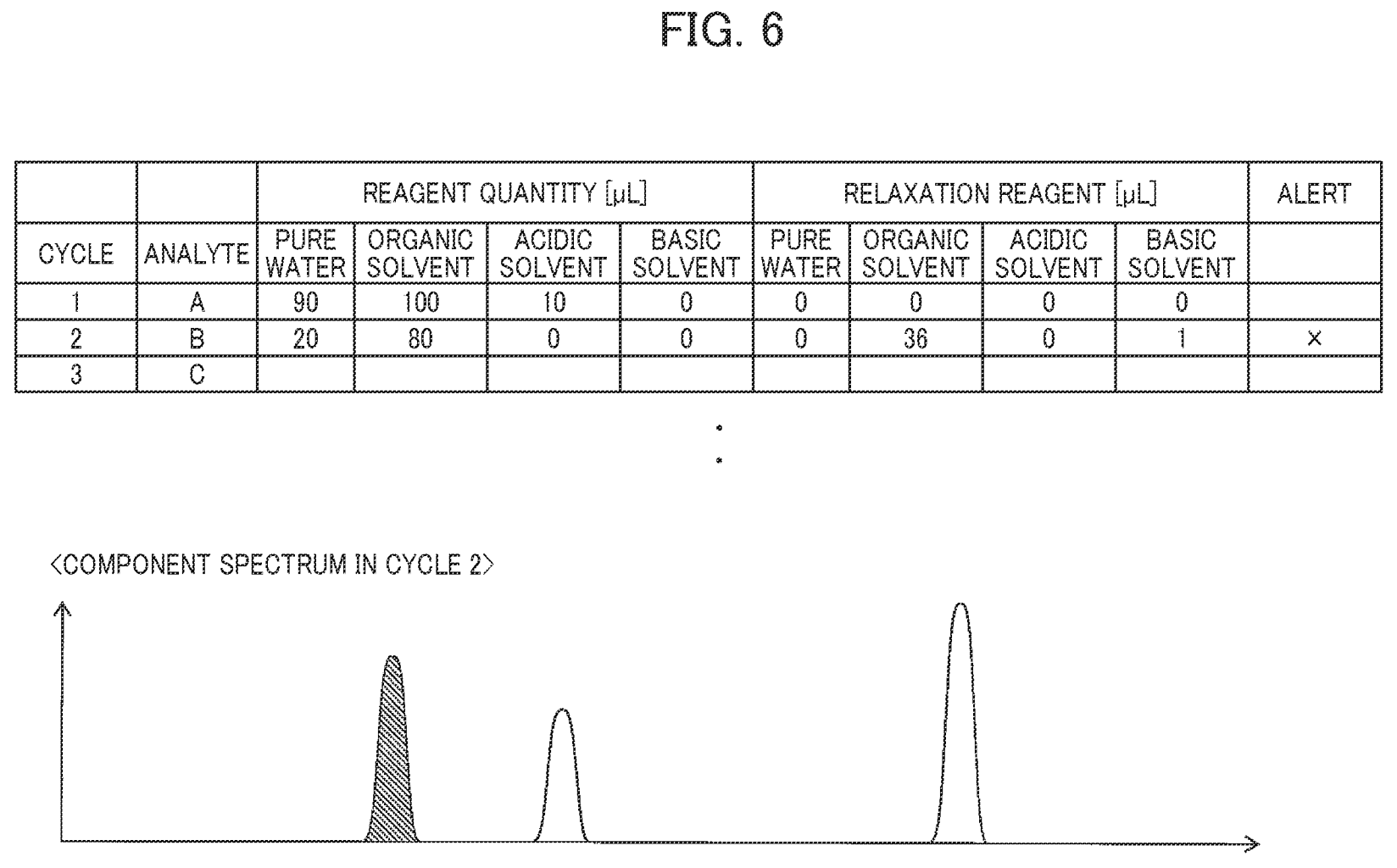

| CYCLE | ANALYTE | REAGENT QUANTITY [μL] | | | | RELAXATION REAGENT [μL] | | | | ALERT |
| | | PURE WATER | ORGANIC SOLVENT | ACIDIC SOLVENT | BASIC SOLVENT | PURE WATER | ORGANIC SOLVENT | ACIDIC SOLVENT | BASIC SOLVENT | |
|---|---|---|---|---|---|---|---|---|---|---|
| 1 | A | 90 | 100 | 10 | 0 | 0 | 0 | 0 | 0 | |
| 2 | B | 20 | 80 | 0 | 0 | 0 | 36 | 0 | 1 | × |
| 3 | C | | | | | | | | | |

‥

〈COMPONENT SPECTRUM IN CYCLE 2〉

AUTOMATED ANALYZER

TECHNICAL FIELD

The present disclosure relates to an automatic analyzer.

BACKGROUND ART

The automatic analyzer is an instrument which, for example, analyzes a component or characteristic of an analyte by reacting the analyte with a reagent and analyzing the reaction. In some cases, a mixed liquid is created by mixing together a plurality of reagents. In this case, the mixed liquid is created by introducing the plural reagents into a mixed liquid chamber in which the reagents are mixed together. The resultant mixed liquid is fed to an analysis process or the like.

The following Patent Literature describes a reagent generator. With an aim to provide a simple configuration for easy creation of a reagent having a highly accurate concentration, the Patent Literature discloses a technique which includes: a conditioning tank for storing a reagent and a diluting liquid; a reagent feed unit for feeding a predetermined quantity of reagent to the conditioning tank; a diluting liquid feed unit for feeding, to the conditioning tank, a smaller quantity of diluting liquid than a quantity necessary for diluting the fed reagent to a desired concentration; a diluting liquid replenishment unit for replenishing the conditioning tank with an arbitrary quantity of diluting liquid; a detector for detecting a concentration of the reagent in the tank; and a control unit for controlling a replenishing operation of the diluting liquid replenishment unit, and which is characterized in that when a concentration of the detected reagent is higher than the desired concentration, the control unit calculates a replenishment quantity of the diluting liquid from a difference between the detected concentration and the desired concentration such as to attain the desired concentration, and that the control unit repeats the control operation of replenishing the conditioning tank with the diluting liquid by a quantity smaller than the calculated replenishment quantity (refer to the abstract).

CITATION LIST

Patent Literature

Patent Literature 1: Japanese Patent Application Laid-Open No. H9(1997)-033538

SUMMARY OF INVENTION

Technical Problem

According to the Patent Literature 1, the reagent is created in high concentration in a conditioning tank 7 (mixed liquid chamber), and a desired reagent is created by feeding pure water into the chamber. In a case where the mixed liquid is created in the mixed liquid chamber as just described, the mixed liquid remaining in the mixed liquid chamber may sometimes affect the subsequent creation of a new mixed liquid.

The present disclosure is made in view of the above-described problems and the object thereof is to provide an automatic analyzer which is adapted to relax the effect of the previously created mixed liquid when a mixed liquid is created anew.

Solution to Problem

The automatic analyzer according to the disclosure is configured to create a second mixed liquid after the creation of a first mixed liquid. In the creation a second mixed liquid, the automatic analyzer introduces a relaxation reagent into the mixed liquid chamber. The relaxation reagent is selected based on the characteristics of the first mixed liquid and relaxes the effect of the first reagent remaining in the mixed liquid chamber.

Advantageous Effects of Invention

In the creation of a mixed liquid, the automatic analyzer according to the present disclosure can relax the effect of the previously created mixed liquid. The other features, advantages and components of the present disclosure will become more apparent from the following detailed description thereof.

BRIEF DESCRIPTION OF THE DRAWINGS

FIG. 3 shows an example explaining a liquid quantity of a relaxation reagent 133.

FIG. 5 shows an example explaining a liquid quantity of a relaxation reagent 133.

FIG. 6 is an example of a user interface provided by a control unit 161.

DESCRIPTION OF EMBODIMENTS

Example 1

Figure 1:
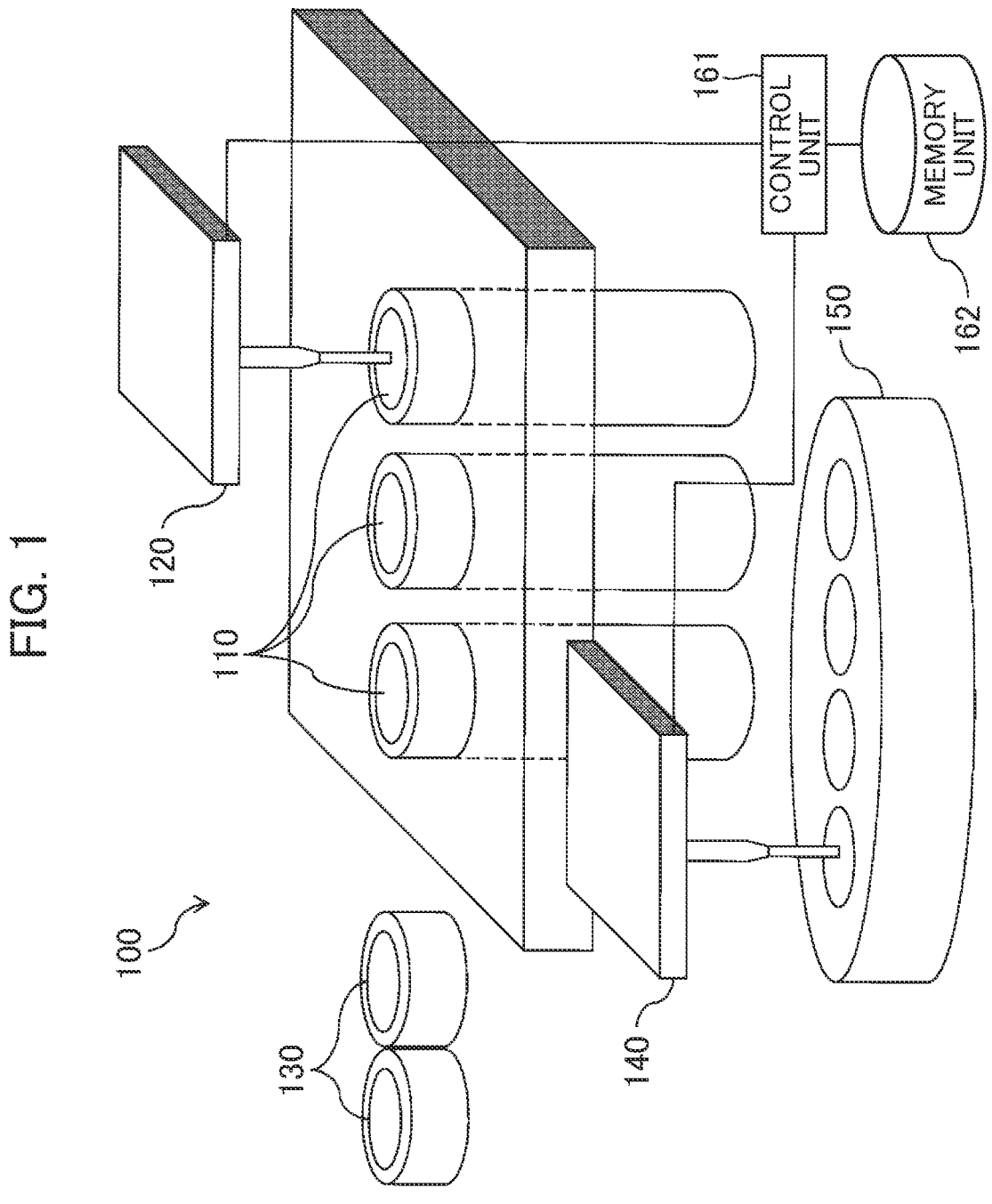
FIG. 1 is a schematic view showing a configuration example of an automatic analyzer 100 according to First Embodiment.

FIG. 1 is a schematic view showing a configuration example of an automatic analyzer 100 according to First Embodiment. The automatic analyzer 100 is an instrument for analyzing a characteristic of an analyte by reacting the analyte with a reagent and analyzing the reaction. The automatic analyzer 100 includes: a mixed liquid chamber 110; a reagent introduction mechanism 120; a reagent container 130; a mixed liquid dispensing mechanism 140; reaction vessel 150; a control unit 161 and a memory unit 162.

The mixed liquid chamber 110 is a vessel used for creating a mixed liquid by introducing a plurality of reagents therein (Sometimes, only one reagent is used). The reagent introduction mechanism 120 sucks up a reagent from the reagent container 130 and introduces the reagent into the mixed liquid chamber 110. The reagent introduction mechanism 120 can be composed of, for example, a liquid dispensing nozzle or the like. The mixed liquid chambers 110 and the reagent containers 130 may be arranged by type.

The mixed liquid dispensing mechanism 140 dispenses the mixed liquid in the mixed liquid chamber 110 to the reaction vessel 150. An analyte is introduced into the reaction vessel 150 by means of an unillustrated analyte introduction mechanism so that the mixed liquid reacts with the analyte on the reaction vessel.

The control unit 161 controls different parts (such as the reagent introduction mechanism 120 and the mixed liquid dispensing mechanism 140) of the automatic analyzer 100. The memory unit 162 is a storage device for storing data used by the control unit 161. The control unit 161 can be constructed by using hardware such as a circuit device implementing its functionality or otherwise, by using an arithmetic device such as CPU (central Processing Unit) executing software implementing its functionality.

Figure 2A:
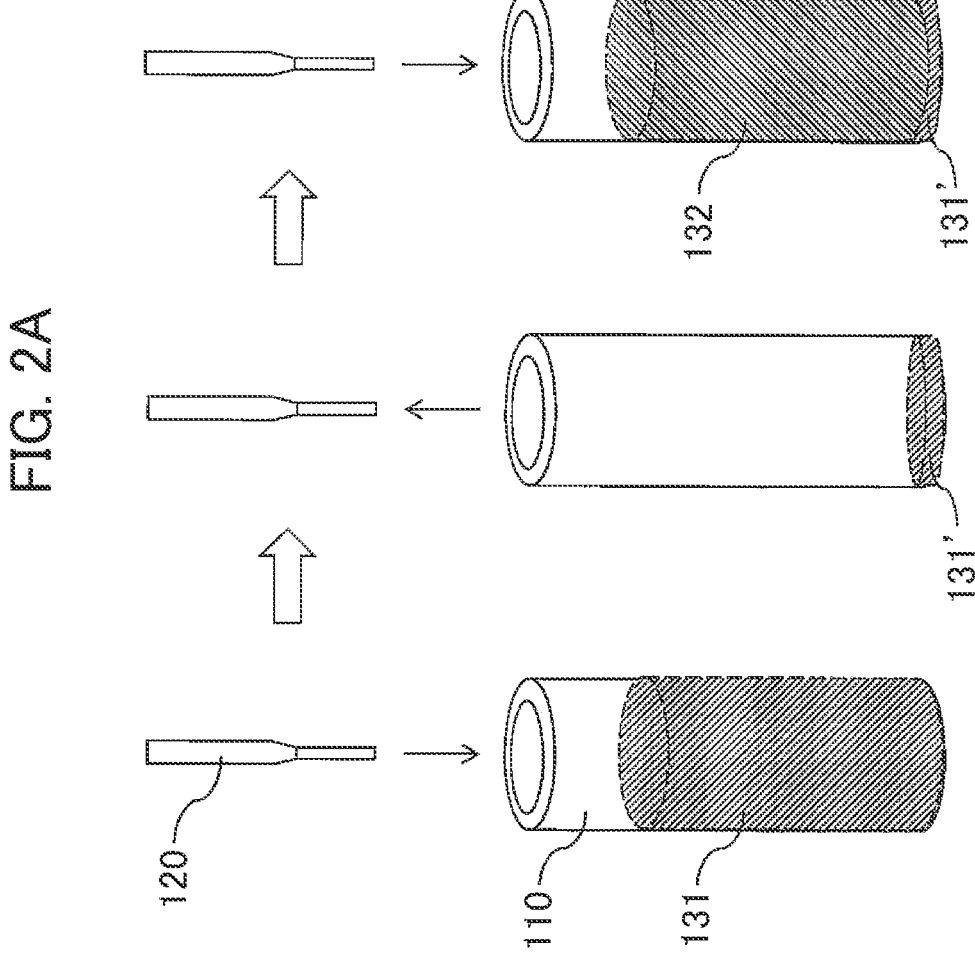
FIG. 2A is a schematic view explaining a procedure for creating a mixed liquid by a conventional automatic analyzer.

FIG. 2A is a schematic view explaining a procedure for creating a mixed liquid by a conventional automatic analyzer. According to a conventional procedure for creating the mixed liquid, a first mixed liquid is created by introducing a first reagent 131 into the mixed liquid chamber 110 (the left-side chamber in FIG. 2A), from which the first mixed liquid is sucked to be supplied to the subsequent process. Hereat, some of the first mixed liquid stays in the mixed liquid chamber 110 as a residual liquid 131'. In addition, the automatic analyzer creates a second mixed liquid by introducing a second reagent 132 into the mixed liquid chamber 110 where the residual liquid 131' remains. The residual liquid 131' contains components of the first reagent 131. The residual components carry a potential to affect the second reagent (or the subsequent process using the second reagent 132), thus resulting in failure to accomplish accurate analysis.

Figure 2B:
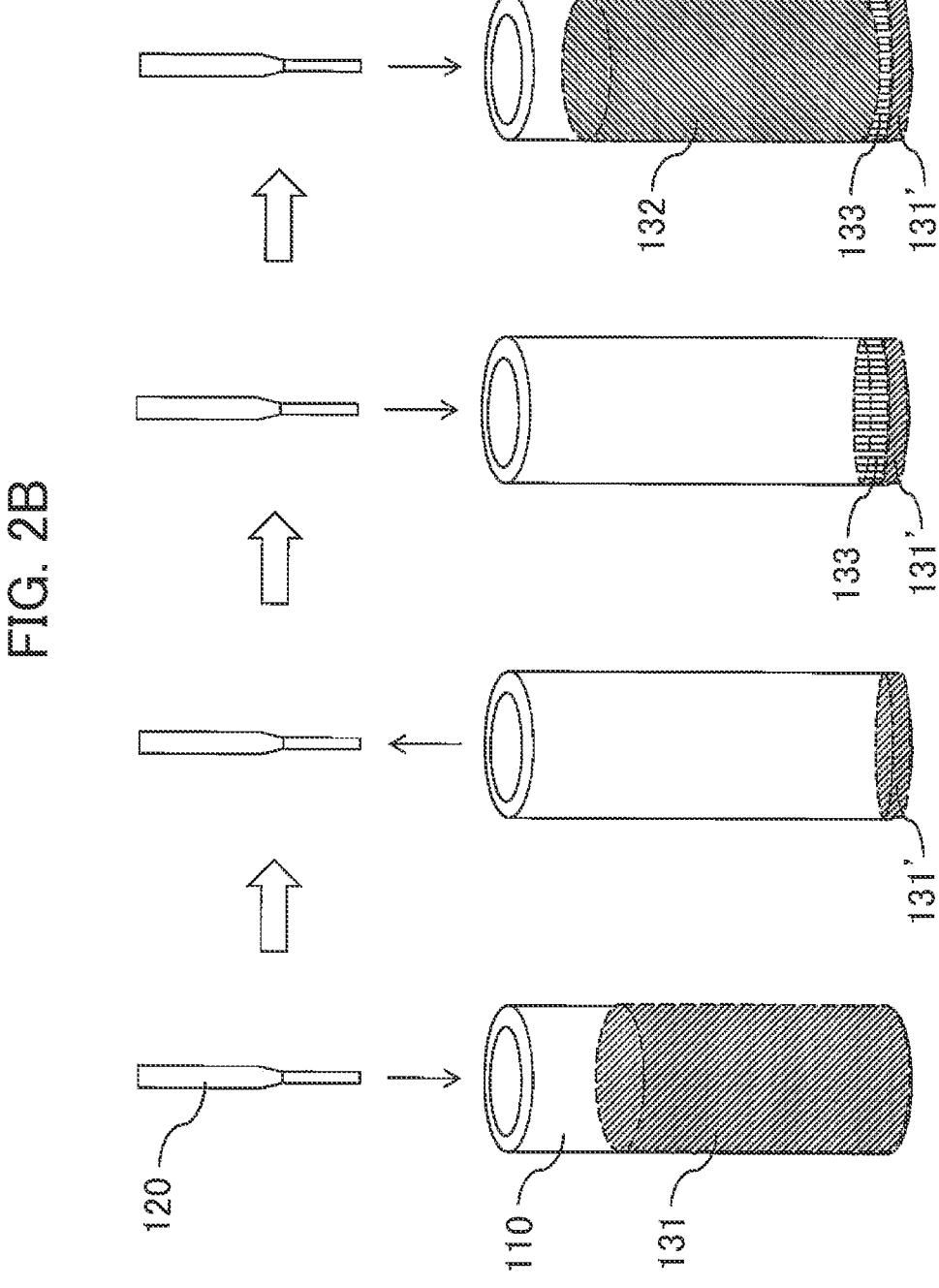
FIG. 2B is a schematic view explaining a procedure for creating a mixed liquid by an automatic analyzer 100 according to First Embodiment.

FIG. 2B is a schematic view explaining a procedure taken by the automatic analyzer 100 according to First Embodiment for creating a mixed liquid. According to First Embodiment, the reagent introduction mechanism 120 sucks the first mixed liquid created using the first reagent 131 out from the mixed liquid chamber 110. Subsequently, the reagent introduction mechanism 120 introduces a relaxation reagent 133 into the mixed liquid chamber 110 before introducing the second reagent 132 into the mixed liquid chamber 110. The relaxation reagent 133 is a reagent capable of relaxing an effect of the residual liquid 131' (or, the residual components of the first reagent 131) on the second reagent 132 (or the subsequent process using the second reagent 132).

Even though the residual liquid 131' remains in the mixed liquid chamber 110, the introduction of the relaxation reagent 133 is effective to relax the effect of the residual liquid and to ensure the accomplishment of an accurate subsequent process. Therefore, the problem caused by the residual liquid 131' during the conventional process of creating the mixed liquid, as shown in FIG. 2A, can be dissolved.

The control unit 161 must have knowledge about the characteristics of the residual liquid 131' before introducing the relaxation reagent 133 into the mixed liquid chamber 110. That is, the control unit must previously gain knowledge about at least one of the component characteristics that can affect the second reagent 132 (or the subsequent process such as one that brings the second reagent 132 into reaction with the analyte). More specifically, a pH value and a molecular polarity of the residual liquid 131' are equivalent to this characteristic. These characteristics of the residual liquid 131' may previously be entered as the characteristics of the first reagent 131 and stored in the memory unit 162. According to the data pieces, the control unit 161 can gain the knowledge about the characteristics of the residual liquid 131' based on the data.

In a case where the pH value of the residual liquid 131' is relaxed by the relaxation reagent 133, what is required of the relaxation reagent 133 is to have a pH value of the opposite polarity to that of the residual liquid. Specifically, if the first reagent 131 is acidic, for example, a usable relaxation agent 133 may have basicity. If the first reagent 131 is basic, a usable relaxation reagent 133 may have acidity.

In a case where the molecular polarity of the residual liquid 131' is relaxed by the relaxation reagent 133, a usable relaxation agent 133 may have a molecular polarity capable of diluting the molecular polarity of the residual liquid 131'. If the first reagent 131 is an organic solvent, for example, pure water is usable as the relaxation agent 133. Otherwise, any other suitable diluting liquid is also usable. Specifically, if the first reagent 131 has a high molecular polarity, a reagent having a lower molecular polarity than the above may be used as the relaxation agent 133. If the first reagent 131 has a low molecular polarity, a reagent having a higher molecular polarity than the above may be used as the relaxation agent 133.

When introducing the relaxation agent 133 into the mixed liquid chamber 110, the control unit 161 needs to gain knowledge about a quantity of the residual liquid 131'. This is because the quantity of the relaxation reagent 133 also varies depending on the quantity of the residual liquid 131'. The quantity of the residual liquid 131' can be typically defined as a dead volume of the mixed liquid chamber 110. The term "dead volume" means a quantity of liquid inevitably remaining in the mixed liquid chamber 110 because of the incapability of the reagent introduction mechanism 120 from sucking up all the reagent in the mixed liquid chamber 110. The dead volume can be calculated based on a configuration of the mixed liquid chamber 110 and a configuration of the reagent introduction mechanism 120 (specifically, a nozzle configuration). Data describing the dead volume may also be stored beforehand in the memory unit 162. This allows the control unit 161 to figure out the dead volume according to the data, thus negating the need for calculating the dead volume each time.

In a case where only a part of the components of the residual liquid 131' affects the subsequent process using the second reagent 132, it is necessary to previously determine a ratio of the concerned component in the residual liquid 133'. This ratio can be determined based on the ratios of the reagents used for the creation of the first mixed liquid. For example, the ratios of the concerned reagents may be written in data describing the dead volume.

FIG. 3 shows an example explaining the quantity of the relaxation reagent 133. In a process (a) of analyzing an analyte A (cycle 1), a mixed liquid containing pure water and an organic solvent in a ratio of 0:100 [μL] is supplied as a first mixed liquid. In a process (b) of analyzing an analyte B (cycle 2), a mixed liquid containing the pure water and the organic solvent in a ratio of 20:80 [μL] is supplied as a second mixed liquid. In these examples, the organic solvent in the cycle 1 is equivalent to the first reagent 131, and the organic solvent in the cycle 2 is equivalent to the second reagent 132.

It is assumed that 10 μL of organic solvent remains as the residual liquid 131' in the mixed liquid chamber 110 after the end of the cycle 1. In the cycle 2, it is necessary to create a mixed liquid containing the pure water and the organic solvent in a ratio of 20:80=1:4. It is therefore necessary to maintain this ratio by relaxing the effect of the residual liquid 131'. In the cycle 2, 2.5 μL of pure water is introduced as the relaxation reagent 133. This gives a ratio of the pure water:the organic solvent (residual liquid 131')=1:4. Hence, the ratio of the pure water:the organic solvent=1:4 can be maintained if a mixed liquid, as the second reagent 132, containing the pure water and the organic solvent in a ratio of 20:80 [µL] is further supplied, the ratio of the pure water:the organic solvent=1:4 can be maintained. Thus, the effect of the residual liquid 131' can be relaxed.

In a case where the pH value of the residual liquid 131' is neutralized by the pH value of the relaxation reagent 133, a liquid quantity of the relaxation reagent 133 is so set as to maintain the quantity of the acidic solvent or the quantity of the basic solvent in the second reagent 132. For example, if the second reagent 132 contains neither the acidic solvent nor the basic solvent, the relaxation reagent 133 capable of perfectly neutralizing the pH value of the residual liquid 131' may be introduced. For example, if the residual liquid 131' has a pH value of 6.0 and has a volume of 10 µL, 10 µL of the relaxation reagent 133 having a pH value of 8.0 may be used.

By taking the above-described procedure, the control unit 161 relaxes the effect of the residual liquid 131' during the use of the second reagent 132. Subsequently, the control unit 161 analyzes the analyte by reacting the second reagent 132 with the analyte and obtains the results. The results of analysis can be obtained in the form of, for example, a spectral value of a component contained in the analyte. The control unit 161 determines that the effect of the residual liquid 131' is adequately relaxed if a spectral area of the component in the analyte is within an allowable range (the quantity of the component assumed to be contained in the analyte). Otherwise, the control unit determines that the effect of the residual liquid 131' is not adequately relaxed by the relaxation reagent 133 and outputs an alert message indicating the unsuccessful relaxation. It is also possible to use a spectral area of an internal standard substance in place of or in combination with the spectral area of the analyte component. Otherwise, the spectral area may also be replaced by a spectral peak value. The same applies to the following embodiments, as well.

Example 1: Summary

After discharging the first reagent 131 from the mixed liquid chamber 110, the automatic analyzer 100 according to the first embodiment introduces the relaxation reagent 133 for relaxing the effect of the first reagent 131 into the mixed liquid chamber 110 before introducing the second reagent 133 into the mixed liquid chamber 110. Thus, the effect of the residual liquid 131' is relaxed so as to provide for a proper implementation of the subsequent process such as analysis using the second reagent 132.

Example 2

Figure 4:
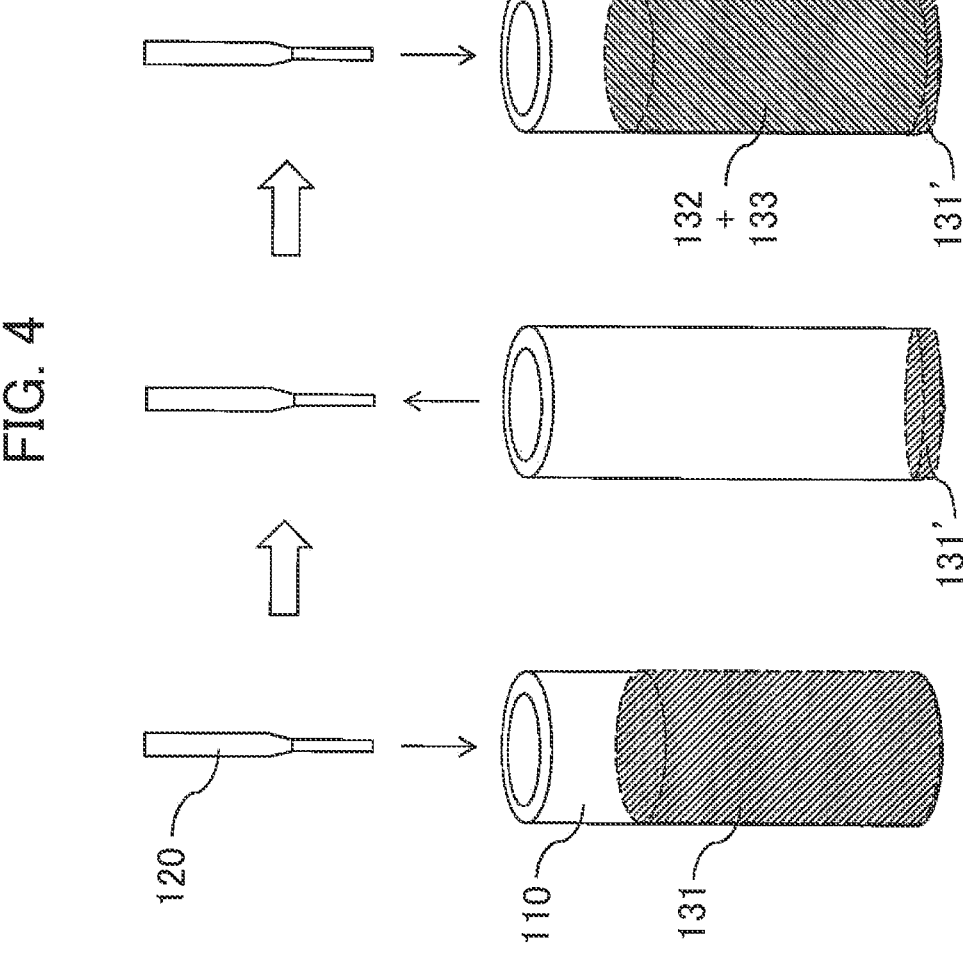
FIG. 4 is a view explaining a procedure for creating a mixed liquid in Second Embodiment.

FIG. 4 is a view explaining a procedure for creating a mixed liquid according to Second Embodiment of the disclosure. The first embodiment illustrates the example where after the discharge of the first reagent 131 from the mixed liquid chamber 110, the relaxation reagent 133 is introduced into the mixed liquid chamber 110, followed by introducing the second reagent 132 into the mixed liquid chamber 110. According to the second embodiment, after the discharge of the first reagent 131 from the mixed liquid chamber 110, a component equivalent to the relaxation reagent 133 is previously mixed in with the second reagent 132 and thereafter, the resultant second reagent 132 is introduced into the mixed liquid chamber 110. This leads to the shortening of the process of introducing the relaxation reagent 133 into the mixed liquid chamber 110. The other constitution is the same as that of the first Embodiment.

Example 3

FIG. 5 shows an example explaining a liquid quantity of a relaxation reagent 133. The first reagent 131 and the second reagent 132 may sometimes have a plurality of characteristics affecting the analyte analysis process. According to FIG. 5, two characteristics including (a) molecular polarity of the organic solvent and (b) respective pH values of the acidic solvent and the basic solvent can each affect the analysis process. The quantities of components constituting the relaxation reagent 133 are determined for each of the characteristics affecting the process. The total sum of the component quantities is regarded as constituting a final relaxation reagent 133.

According to the example shown in FIG. 5, the second reagent 132 in the cycle 2 is a mixed liquid where the pure water and the organic solvent are mixed in a ratio of 20:80 [µL]. Since 9 µL of pure water remains in the chamber as the residual liquid 131', 36 µL of an organic solvent is used as the relaxation reagent 133. This gives a mixed liquid containing the pure water and the organic solvent in a ratio of 9:36=1:4 and hence, the second reagent 132 can maintain the ratio of these reagents.

In some cases, the mixed liquid contains only one of either the acidic solvent or the basic solvent. In this case, the mixed liquid contains only one of either the acidic solvent or the basic solvent and may further contain a component other than these solvents as needed. It is assumed in the example shown in FIG. 5 that both the acidic solvent and the basic solvent are contained in the second reagent 132 in the cycle 2 in a quantity of 0 µL (namely, the reagent is neutral). Since 1 µL of the acidic solvent remains as the residual liquid 131', 1 µL of the basic solvent is used as the relaxation reagent 133. Thus, the pH value of the acidic solvent and the pH value of the basic solvent virtually cancel each other out so that that the pH values of these solvents in the second reagent 132 can be maintained as assumed. Specifically, the control unit 161 previously selects a characteristic and a liquid quantity of the relaxation reagent 133 capable of neutralizing the second reagent residual liquid 131' such that the respective pH values of the acidic solvent and basic solvent present in the second reagent 132 may not vary when the second reagent 132 is introduced into the mixed liquid chamber 110.

Example 4

FIG. 6 is an example of a user interface provided by the control unit 161. The user interface presents a quantity of reagent for each analysis cycle and also presents information indicating whether or not the effect of the first reagent 131 is fully relaxed by the relaxation reagent 133. Criteria for determining whether the effect of the first reagent 131 is fully relaxed or not are just as described in the first embodiment.

The cycle 2 shown in FIG. 6 is marked with an alert sign indicating that a part where the spectral area of the analyte component exceeds the allowable range is found. The control unit 161 can output to the memory unit 162, for example, data describing contents shown in an upper part of FIG. 6. In addition, the control unit 161 can provide a user interface as shown in FIG. 6 by outputting the contents of data to a device on a display. As illustrated by a hatched portion in a lower part of FIG. 6, what part of the component spectrum was out of the allowable range may be presented on the user interface. In the case of the example shown in the lower part of FIG. 6, it can be deduced that the component in the first reagent 131 that affects the component corresponding to the hatched portion could not be fully relaxed.

The user interface may be provided by a device other than the automatic analyzer 100. For example, the control unit 161 may also be configured to store the data describing the contents shown in FIG. 6 while another device may be configured to read the data and to present the user interface as shown in FIG. 6.

<Modifications of Disclosure>

The present disclosure is not limited to the above-described examples but can include a variety of modifications. The foregoing examples, for instance, are the detailed illustrations to clarify the disclosure. The disclosure is not necessarily limited to those including all the components described above. One component of one example can be replaced by another component of another example. Further, one component of one example can be added to the arrangement of another example. A part of the arrangement of each example permits addition of some component of another example, the omission thereof or replacement thereof.

In the foregoing examples, the relaxation reagent 133 may be introduced between the first reagent 131 and the second reagent 132 in a certain cycle, as explained with reference to FIG. 2B, for example. In another cycle, as explained with reference to FIG. 4, the second reagent 132 and the relaxation reagent 133 may be collectively introduced.

According to the foregoing examples, the mixed liquid in the mixed liquid chamber 110 can be agitated by means of a mixer. For example, a functional capability of a mixer can be provided by vibrating the whole body of a plate carrying the mixed liquid chamber 110 thereon.

In the foregoing examples, the characteristic of the residual liquid 131' and the characteristic of the relaxation reagent 133 need not be perfectly opposite. Even though the residual liquid 131' has a pH value of 6.0 and the relaxation reagent has a pH value of 7.5, the pH value of the residual liquid 131' can be neutralized by using the relaxation reagent 133 twice as much as the residual liquid 131'. Even though the residual liquid 131' cannot be perfectly neutralized, all that is needed is to relax the pH value of the residual liquid to a degree that the subsequent step using the second reagent 132 is little affected. The same holds for the other characteristics such as the molecular polarity and the like of the residual liquid 131'.

In the foregoing examples, the quantities of the first reagent 131 and the second reagent 132 may be so defined as to establish an optimum component ratio in the analysis process for each analyte. In a case where a reagent having a pH value of 8.0 (basic) need be supplied in the analysis process of the analyte A, for example, the analysis process is performed as follows. A reagent having a stronger basicity is previously created as the first reagent 131, and the pH value of the first reagent is neutralized in the subsequent step before performing the analysis process.

In the foregoing examples, examples of the reagent constituting the mixed liquid include: CAN (Acetonitrile); MeOH (methanol); suitable basic or acidic buffer liquids; and the like.

The foregoing examples illustrate the pH value and molecular polarity as examples of the characteristics of the residual liquid 131' that affect the subsequent process. Regarding the other characteristics affecting the subsequent process, a reagent relaxing the effect of the residual liquid is also usable as the relaxation reagent.

REFERENCE SIGNS LIST

100 automatic analyzer
110 mixed liquid chamber

120 reagent introduction mechanism
130 reagent container
140 mixed liquid dispensing mechanism
150 reaction vessel
161 control unit
162 memory unit

What is claimed is:

1. An automatic analyzer for analyzing an analyte by using a reagent, the automatic analyzer comprising:
   a mixed liquid chamber to create a mixed liquid by mixing the reagent with another liquid;
   a nozzle to introduce the reagent into the mixed liquid chamber;
   a control unit to control the nozzle; and
   a memory unit to store data describing characteristics of the first reagent,
   wherein the nozzle creates a first mixed liquid by introducing a first reagent into the mixed liquid chamber,
   wherein the nozzle creates a second mixed liquid by introducing a second reagent into the mixed liquid chamber after the first mixed liquid is discharged from the mixed liquid chamber, and
   wherein the nozzle introduces a relaxation reagent to relax an effect of the first reagent remaining in the mixed liquid chamber into the mixed liquid chamber when the second mixed liquid is created on the basis of characteristics of the first reagent, and
   wherein the control unit specifies a reagent to relax the effect of the first reagent remaining in the mixed liquid chamber when the second mixed liquid is created in accordance with the characteristics of the first reagent described by the data and uses the specified reagent as the relaxation reagent.

2. The automatic analyzer according to claim 1, wherein the nozzle introduces the relaxation reagent into the mixed liquid chamber after the first mixed liquid is discharged from the mixed liquid chamber and before the second reagent is introduced into the mixed liquid chamber.

3. The automatic analyzer according to claim 1, wherein the nozzle introduces the relaxation reagent as at least a part of the second reagent into the mixed liquid chamber.

4. The automatic analyzer according to claim 1, wherein the control unit decides characteristics of the relaxation reagent and a quantity of the relaxation reagent so as to be able to secure characteristics of the second mixed liquid necessary in an analysis process using the second mixed liquid by relaxing the effect given by the first reagent.

5. The automatic analyzer according to claim 1,
   wherein the first reagent has a pH value as a characteristic of the first reagent, and
   wherein the nozzle uses a reagent having a pH value capable of neutralizing the pH value of the first reagent as the relaxation reagent.

6. The automatic analyzer according to claim 1,
   wherein the first reagent has a molecular polarity as a characteristic of the first reagent, and
   wherein the nozzle uses a reagent having a molecular polarity capable of diluting the molecular polarity of the first reagent as the relaxation reagent.

7. The automatic analyzer according to claim 1,
   wherein the first reagent has a first pH value and a first molecular polarity, and
   wherein the nozzle uses a mixed reagent in which a reagent having a second pH value capable of neutralizing the first pHI value and a reagent having a second molecular polarity capable of diluting the first molecular polarity are mixed as the relaxation reagent.

8. The automatic analyzer according to claim 1,
wherein the second reagent is a reagent containing at least either of an acidic solvent and a basic solvent, and
wherein the control unit selects, as the relaxation reagent, a reagent capable of not changing a pH value of the acidic solvent and a pH value of the basic solvent contained in the second reagent by the first reagent remaining in the mixed liquid chamber when the second mixed liquid is created by neutralizing the first reagent remaining in the mixed liquid chamber after operation of discharging the first mixed liquid from the mixed liquid chamber is performed.

9. The automatic analyzer according to claim 1,
wherein the second reagent is a reagent in which an organic solvent and a non-organic solvent are mixed at a predetermined ratio, and
wherein the control unit selects the relaxation reagent so that the ratio of the organic solvent and the non-organic solvent existing in the mixed liquid chamber may be the predetermined ratio when the second mixed liquid is created, in accordance with liquid quantities of the organic solvent and the non-organic solvent remaining in the mixed liquid chamber after operation of discharging the first mixed liquid from the mixed liquid chamber is performed.

10. The automatic analyzer according to claim 1,
wherein the automatic analyzer outputs information indicating whether or not the effect of the first reagent is relaxed to an allowable extent when the second mixed liquid is created, in accordance with whether or not a spectral peak value or a spectral area of a component contained in the analyte or a component contained in an internal reference material analyzed with the analyte is within an allowable range.

11. The automatic analyzer according to claim 10, wherein the automatic analyzer, if the effect of the first reagent is not relaxed to an allowable extent when the second mixed liquid is created, outputs an alert indicating the status.

12. The automatic analyzer according to claim 10,
wherein the automatic analyzer performs a process of analyzing the analyte multiple times by using the second mixed liquid, and
wherein with regard to a process of not relaxing the effect of the first reagent remaining in the mixed liquid chamber to an allowable extent in the processes performed multiple times, the automatic analyzer gives a flag indicating the status to data describing the result of the process.

13. The automatic analyzer according to claim 10, further comprising a user interface for presenting the information.

14. An automatic analyzer for analyzing an analyte by using a reagent, the automatic analyzer comprising:
a mixed liquid chamber to create a mixed liquid by mixing the reagent with another liquid;
a nozzle to introduce the reagent into the mixed liquid chamber; and
a control unit to control the nozzle;
wherein the nozzle creates a first mixed liquid by introducing a first reagent into the mixed liquid chamber,
wherein the nozzle creates a second mixed liquid by introducing a second reagent into the mixed liquid chamber after the first mixed liquid is discharged from the mixed liquid chamber,
wherein the nozzle introduces a relaxation reagent to relax an effect of the first reagent remaining in the mixed liquid chamber into the mixed liquid chamber when the second mixed liquid is created on the basis of characteristics of the first reagent, and
wherein the control unit decides a quantity of the relaxation reagent in accordance with a liquid quantity of the first reagent remaining in the mixed liquid chamber after operation of discharging the first mixed liquid from the mixed liquid chamber is performed.

15. The automatic analyzer according to claim 14, wherein the nozzle introduces the relaxation reagent into the mixed liquid chamber after the first mixed liquid is discharged from the mixed liquid chamber and before the second reagent is introduced into the mixed liquid chamber.

16. The automatic analyzer according to claim 14, wherein the nozzle introduces the relaxation reagent as at least a part of the second reagent into the mixed liquid chamber.

17. The automatic analyzer according to claim 14, wherein the control unit decides characteristics of the relaxation reagent and a quantity of the relaxation reagent so as to be able to secure characteristics of the second mixed liquid necessary in an analysis process using the second mixed liquid by relaxing the effect given by the first reagent.

18. The automatic analyzer according to claim 14,
wherein the first reagent has a pH value as a characteristic of the first reagent, and
wherein the nozzle uses a reagent having a pH value capable of neutralizing the pH value of the first reagent as the relaxation reagent.

19. The automatic analyzer according to claim 14,
wherein the first reagent has a molecular polarity as a characteristic of the first reagent, and
wherein the nozzle uses a reagent having a molecular polarity capable of diluting the molecular polarity of the first reagent as the relaxation reagent.

20. The automatic analyzer according to claim 14,
wherein the first reagent has a first pH value and a first molecular polarity, and
wherein the nozzle uses a mixed reagent in which a reagent having a second pH value capable of neutralizing the first pH value and a reagent having a second molecular polarity capable of diluting the first molecular polarity are mixed as the relaxation reagent.

21. The automatic analyzer according to claim 14,
wherein the second reagent is a reagent containing at least either of an acidic solvent and a basic solvent, and
wherein the control unit selects, as the relaxation reagent, a reagent capable of not changing a pH value of the acidic solvent and a pH value of the basic solvent contained in the second reagent by the first reagent remaining in the mixed liquid chamber when the second mixed liquid is created by neutralizing the first reagent remaining in the mixed liquid chamber after operation of discharging the first mixed liquid from the mixed liquid chamber is performed.

22. The automatic analyzer according to claim 14,
wherein the second reagent is a reagent in which an organic solvent and a non-organic solvent are mixed at a predetermined ratio, and
wherein the control unit selects the relaxation reagent so that the ratio of the organic solvent and the non-organic solvent existing in the mixed liquid chamber may be the predetermined ratio when the second mixed liquid is created, in accordance with liquid quantities of the organic solvent and the non-organic solvent remaining in the mixed liquid chamber after operation of discharging the first mixed liquid from the mixed liquid chamber is performed.

23. The automatic analyzer according to claim 14,
wherein the automatic analyzer outputs information indi-
cating whether or not the effect of the first reagent is
relaxed to an allowable extent when the second mixed
liquid is created, in accordance with whether or not a
spectral peak value or a spectral area of a component
contained in the analyte or a component contained in an
internal reference material analyzed with the analyte is
within an allowable range.

24. The automatic analyzer according to claim 23,
wherein the automatic analyzer, if the effect of the first
reagent is not relaxed to an allowable extent when the
second mixed liquid is created, outputs an alert indicating
the status.

25. The automatic analyzer according to claim 23,
wherein the automatic analyzer performs a process of
analyzing the analyte multiple times by using the
second mixed liquid, and
wherein with regard to a process of not relaxing the effect
of the first reagent remaining in the mixed liquid
chamber to an allowable extent in the processes per-
formed multiple times, the automatic analyzer gives a
flag indicating the status to data describing the result of
the process.

26. The automatic analyzer according to claim 23, further
comprising a user interface for presenting the information.

\* \* \* \* \*